US012115127B2

(12) United States Patent
Yano et al.

(10) Patent No.: US 12,115,127 B2
(45) Date of Patent: Oct. 15, 2024

(54) CAP AND CAPPED VIAL

(71) Applicant: TAISEI KAKO CO., LTD., Osaka (JP)

(72) Inventors: Yukihiro Yano, Osaka (JP); Satoshi Miyatake, Osaka (JP); Yukihiro Ogawa, Osaka (JP); Shigenori Uchi, Osaka (JP)

(73) Assignee: TAISEI KAKO CO., LTD., Osaka (JP)

( * ) Notice: Subject to any disclaimer, the term of this patent is extended or adjusted under 35 U.S.C. 154(b) by 397 days.

(21) Appl. No.: 17/622,777

(22) PCT Filed: Jul. 2, 2020

(86) PCT No.: PCT/JP2020/026003

§ 371 (c)(1),
(2) Date: Dec. 24, 2021

(87) PCT Pub. No.: WO2021/002427

PCT Pub. Date: Jan. 7, 2021

(65) Prior Publication Data

US 2022/0241149 A1 Aug. 4, 2022

(30) Foreign Application Priority Data

Jul. 2, 2019 (JP) ................................ 2019-124057

(51) Int. Cl.

| | |
|---|---|
| ***A61J 1/14*** | (2023.01) |
| ***B65D 51/00*** | (2006.01) |
| ***B65D 51/20*** | (2006.01) |

(52) U.S. Cl.

CPC .......... *A61J 1/1412* (2013.01); *B65D 51/002* (2013.01); *B65D 51/20* (2013.01); *B65D 2251/0015* (2013.01); *B65D 2251/0075* (2013.01)

(58) Field of Classification Search

CPC ..... A61J 1/1412; B65D 51/002; B65D 51/20; B65D 2251/0015; B65D 2251/0075

(Continued)

(56) References Cited

U.S. PATENT DOCUMENTS

| | | | | |
|---|---|---|---|---|
| 2,748,967 A | | 6/1956 | Roach | |
| 3,587,897 A | * | 6/1971 | Rohde | B65D 51/002 215/249 |

(Continued)

FOREIGN PATENT DOCUMENTS

| | | |
|---|---|---|
| EP | 0120353 A2 | 10/1984 |
| JP | H07-021564 U | 4/1995 |

(Continued)

OTHER PUBLICATIONS

Extended European Search Report for the corresponding European Patent Application No. 20835284.9 issued by the European Patent Office on Jul. 12, 2023.

(Continued)

*Primary Examiner* — J. Gregory Pickett
*Assistant Examiner* — Niki M Eloshway
(74) *Attorney, Agent, or Firm* — Ladas & Parry, LLP

(57) ABSTRACT

Provided is a cap including: a cap body; a protective cover; and an attaching device for attaching the protective cover and a top plate of the cap body to each other. The top plate includes: a through hole; and a top plate annular portion. The protective cover includes a cover body having a lower surface arranged away from the top plate. The attaching device includes a cover attaching portion formed into an annular shape around the through hole and projecting from the lower surface of the cover body toward the top side of the top plate annular portion or from the top side of the top (Continued)

plate annular portion toward the lower surface of the cover body to attach the protective cover and the top plate to each other.

5 Claims, 12 Drawing Sheets

(58) Field of Classification Search
USPC .......................................................... 215/247
See application file for complete search history.

(56) References Cited

U.S. PATENT DOCUMENTS

| | | | | |
|---|---|---|---|---|
| 4,471,879 | A * | 9/1984 | Connor | B65D 51/002 215/249 |
| 5,314,084 | A | 5/1994 | Folta et al. | |
| 5,421,459 | A * | 6/1995 | Mazzotti | B65D 1/36 206/549 |
| 7,946,437 | B2 * | 5/2011 | Thilly | B65D 23/001 215/249 |
| 8,225,949 | B2 * | 7/2012 | Aneas | B65D 51/002 604/905 |
| 8,393,484 | B2 * | 3/2013 | Benedetti | B65D 51/228 215/261 |
| 8,777,031 | B2 * | 7/2014 | Aneas | B65D 51/241 215/277 |
| 2008/0000870 | A1 * | 1/2008 | Lopez Alvarez | B65D 51/18 215/355 |
| 2010/0089862 | A1 * | 4/2010 | Schmitt | B65D 51/241 215/249 |
| 2011/0266249 | A1 * | 11/2011 | Kakutani | B65D 51/002 215/296 |
| 2012/0118894 | A1 * | 5/2012 | Kawamura | B65D 51/002 220/378 |
| 2012/0160850 | A1 * | 6/2012 | Gelibert | B65D 55/063 220/315 |
| 2014/0209603 | A1 * | 7/2014 | Aneas | B65D 51/002 220/259.5 |
| 2014/0217099 | A1 * | 8/2014 | Browne | A61J 1/1412 220/259.5 |
| 2016/0194121 | A1 | 7/2016 | Ogawa et al. | |
| 2017/0121163 | A1 * | 5/2017 | Mutterle | B65D 51/002 |
| 2017/0297781 | A1 * | 10/2017 | Kawamura | B65D 51/18 |
| 2018/0148232 | A1 * | 5/2018 | Castillo | B65D 41/58 |

FOREIGN PATENT DOCUMENTS

| | | | |
|---|---|---|---|
| JP | 2011-093586 | A | 5/2011 |
| WO | 2015029580 | A | 3/2015 |

OTHER PUBLICATIONS

Written Opinion of the International Searching Authority from PCT/JP2020/026003, dated Sep. 15, 2020, with English translation from WIPO, all pages.
International Preliminary Report on Patentability from PCT/JP2020/026003, dated Dec. 28, 2021, with English translation from WIPO, all pages.
International Search Report in the international application No. PCT/JP2020/026003, mailed on Sep. 15, 2020, all pages.
Written Opinion of the International Searching Authority in the international application No. PCT/JP2020/026003, mailed on Sep. 15, 2020 with English translation provided by Google Translate, all pages.

* cited by examiner

CAP AND CAPPED VIAL

CROSS-REFERENCE TO RELATED APPLICATIONS

This application is the U.S. national phase of PCT Application PCT/JP2020/026003 filed on Jul. 2, 2020, which claims priority to Japanese Patent Application No. 2019-124057 filed on Jul. 2, 2019, the disclosures of which are incorporated herein by reference in their entireties.

FIELD

The present invention relates to a cap mounted to a vial in which a chemical agent is contained and that has a mouth to which a stopper is internally fitted, the cap configured to close the stopper until the chemical agent is administered, and relates to a capped vial.

BACKGROUND

Conventionally used has been a vial in which medical liquid can be contained and that has a mouth closed by a stopper. Also known is a cap for sealing such a vial (Patent Literature 1). The cap includes: a cap body mounted to the vial; and a protective cover attached to the cap body. The cap body includes: a top plate with a through hole in the center (that is, a top plate having a substantially circular annular shape); and a cylindrical portion extending downward from the outer edge of the top plate. The through hole of the cap body exposes the stopper in the state where the cap body is mounted to the vial. The protective cover has a substantially disc shape, and is attached to the cap body in the state where the lower surface of the protective cover is in contact with the entire area of the upper surface of the top plate. The protective cover thus attached to the cap body closes the stopper exposed through the through hole cap body. The protective cover extends slightly outward of the top plate of the cap body, as viewed from a direction of a cylinder axis of the cap body. This configuration produces a slight space outside the outer edge of the cap under the protective cover.

When the liquid medicine contained in such a vial is used, the protective cover is removed from the cap body while the cap body is left mounted to the vial. For example, the operator pushes up the protective cover from the cap body using his or her finger to detach the protective cover from the cap body for removal. Thereafter, the operator inserts a syringe needle into the stopper exposed through the through hole of the cap body to suction the liquid medicine from the vial into the syringe for use.

CITATION LIST

Patent Literature

Patent Literature 1: WO 2015/029580 A

SUMMARY

Technical Problem

In the cap, the space outside the outer circumferential portion of the cap body under the protective cover is small, and the lower surface of the protective cover adheres to the top plate in contact with the entire area of the upper surface of the top plate. In the cap configured as above, it is difficult to detach the protective cover from the cap body.

It is an object of the present invention to provide a cap having a protective cover easily detachable therefrom.

Solution to Problem

A cap of the present invention is a cap for being mounted to a vial that has a mouth located on a top side and having an opening closed by a stopper, and includes: a cap body including a tubular body capable of being externally fitted to the mouth of the vial, and a top plate that is arranged on the top side of the tubular body and that has a through hole through which a top side surface of the stopper is exposed in a state where the tubular body is externally fitted to the mouth of the vial; a protective cover detachably attached to the top side of the top plate; and an attaching device for attaching the protective cover and the top plate to each other, in which the top plate includes a top plate annular portion arranged around the through hole, the protective cover includes a cover body having a lower surface arranged away from the top plate in a state where the protective cover is attached to the top plate, and the attaching device includes a cover attaching portion formed into an annular shape around the through hole and projecting from the lower surface of the cover body toward the top side of the top plate annular portion or from the top side of the top plate annular portion toward the lower surface of the cover body to attach the protective cover and the top plate to each other.

The configuration can be such that the attaching device includes a cover projecting portion arranged radially outside the cover attaching portion.

The cap can be configured such that the cover projecting portion extends radially outward from the cover attaching portion.

The cap can be configured such that the top plate includes a top plate projecting portion projecting downward from a lower surface of the top plate annular portion, and that the top plate projecting portion is formed into an annular shape that surrounds the through hole of the top plate.

The cap can be configured such that an inner circumferential surface of the tubular body of the cap body includes a plurality of vertical ribs projecting in a radially inward direction from the inner circumferential surface and extending downward, and the plurality of vertical ribs are configured to bring their leading end edges into contact with an outer circumferential portion of the stopper.

A capped vial of the present invention includes: a vial that has a mouth located on a top side and having an opening closed by a stopper; and a cap for being mounted to the vial, in which the cap includes: a cap body including a tubular body capable of being externally fitted to the mouth of the vial, and a top plate that is arranged on the top side of the tubular body and that has a through hole through which a top side surface of the stopper is exposed in a state where the tubular body is externally fitted to the mouth of the vial; a protective cover detachably attached to the top side of the top plate; and an attaching device for attaching the protective cover and the top plate to each other, the top plate includes a top plate annular portion arranged around the through hole, the protective cover includes a cover body having a lower surface arranged away from the top plate in a state where the protective cover is attached to the top plate, and the attaching device includes a cover attaching portion formed into an annular shape around the through hole and projecting from the lower surface of the cover body toward the top side of the top plate annular portion or from the top side of the top plate annular portion toward the lower surface of the cover body to attach the protective cover and the top plate to each other.

DESCRIPTION OF EMBODIMENTS

Figure 1:
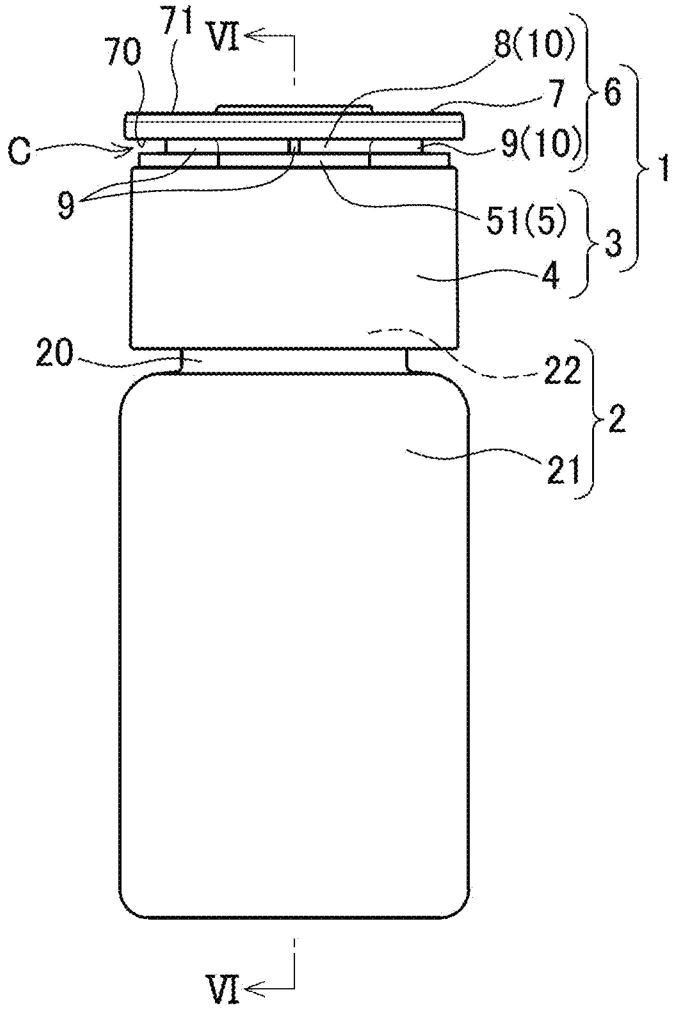
FIG. 1 is a front view of a vial to which a cap according to this embodiment is attached.
Figure 2:
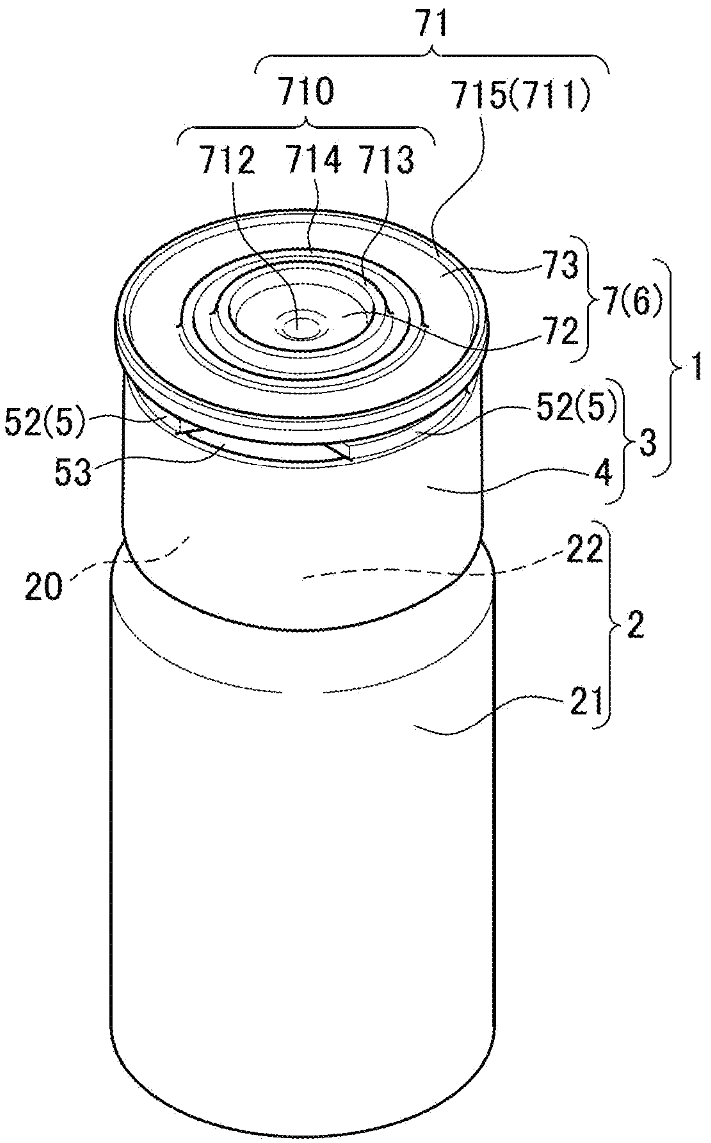
FIG. 2 is a perspective view of the vial to which the cap is mounted.

An embodiment of the present invention will be described with reference to FIGS. 1 to 6. As shown in FIG. 1 and FIG. 2, a cap 1 of this embodiment is mounted to a mouth 20 of a vial 2. The cap 1 includes: a cap body 3; a protective cover 6; and an attaching device 10 configured to attach the protective cover 6 and the cap body 3 to each other. Hereinafter, the description on the configuration of the vial 2 will be first given, followed by the description on the configurations of the cap body 3 and the protective cover 6 that form the cap 1.

Figure 3:
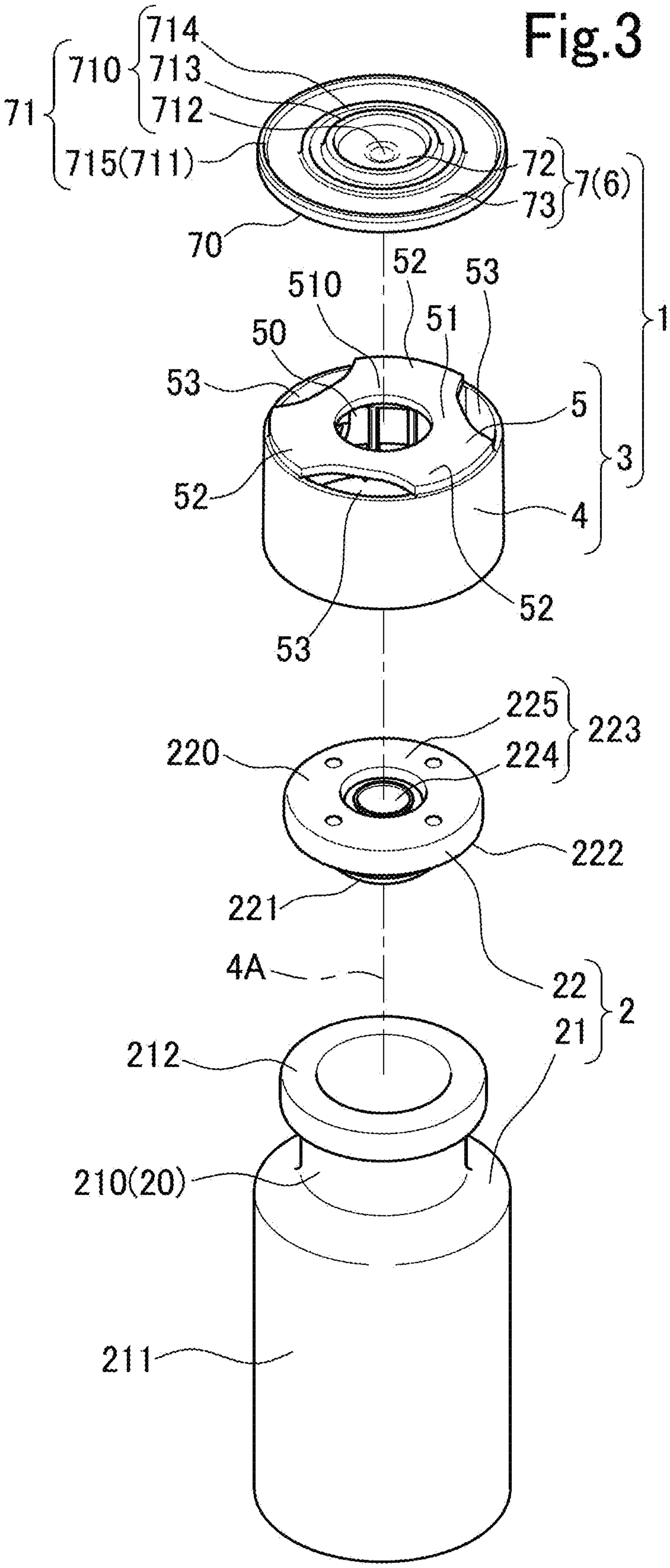
FIG. 3 is an exploded perspective view of the vial to which the cap is mounted.

The vial 2 is a container for containing medicine, for example, liquid medicine. The liquid medicine contained in the vial 2 is, for example, liquid medicine stored or transported in a frozen state or a low temperature state (for example −85° C.). The mouth 20 of the vial 2 is located on a top side (i.e., an upper side in FIG. 1 and FIG. 2). As shown in FIG. 3, the vial 2 includes a bottle 21 for containing liquid medicine, and the stopper 22 that closes the mouth 20 of the bottle 21. Hereinafter, a direction in which the mouth 20 extends, that is, a height direction of the mouth 20 (i.e., a vertical direction of the mouth 20 (a vertical direction in FIG. 1 to FIG. 3)) is referred to simply as “height direction”. An opposite side in the height direction to the top side is referred to as “lower side”.

The bottle 21 is, for example, a member for containing liquid medicine (see FIG. 3). The bottle 21 has, for example, a bottomed cylindrical shape. The bottle 21 of this embodiment includes: a bottle mouth 210 located on the top side and forming the mouth 20 of the vial 2; and a bottle body 211 continuous with the bottle mouth 210 and having a larger diameter than that of the bottle mouth 210. The bottle mouth 210 of this embodiment includes a flange 212 forming an end on the top side of the bottle mouth 210 and projecting radially outward.

The stopper 22 is a member that tightly closes the bottle 21 and through which an injection needle is pierced when the liquid medicine therein is administered to a patient. The stopper 22 of this embodiment is internally fitted into the mouth 20. Further, the stopper 22 includes, for example, a large diameter stopper portion 220 having a substantially disc shape and arranged on the top side, and a small diameter stopper portion 221 projecting downward from the large diameter stopper portion 220 and having a smaller diameter than that of the large diameter stopper portion 220. Examples of the material of the stopper 22 include an elastic body such as butyl rubber.

The large diameter stopper portion 220 is a portion placed on the flange 212 of the bottle mouth 210. The large diameter stopper portion 220 includes a lower surface 222 located on the lower side and a top surface 223 located on the top side.

The top surface 223 includes a top surface central portion 224 located at the center in a radial direction, and a top surface outer circumferential portion 225 located radially outside the top surface central portion 224 and located on the top side of the top surface central portion 224. That is, the top surface 223 has such a shape that the top surface central portion 224 is one step lower than the top surface outer circumferential portion 225.

The small diameter stopper portion 221 is a portion placed inside the bottle mouth 210. The small diameter stopper portion 221 extends downward from the lower surface 222 of the large diameter stopper portion 220. For example, the small diameter stopper portion 221 has a cylindrical shape.

In the cap 1, the attaching device 10 for attaching the protective cover 6 and a top plate 5 to each other is formed depending on the materials or the shapes of the cap body 3 and the protective cover 6. Specifically, in the attaching device 10, the protective cover 6 and the top plate 5 are attached to each other by the adhesive force of both the protective cover 6 and the top plate 5 to cause the protective cover 6 and the top plate 5 to adhere to each other. This adhesive force is produced due to a combination of the materials of the cap body 3 and the protective cover 6, which will be described later. Further, as will be described later, the attaching device 10 projects from a lower surface 70 of a cover body 7 toward the top side of a top plate annular portion 51, or from the top side of the top plate annular portion 51 toward the lower surface 70 of the cover body 7, to allow the protective cover 6 and the top plate 5 to be attached to each other. The attaching device 10 of this embodiment projects from the lower surface 70 of the cover body 7 toward the top side of the top plate annular portion 51. Further, the attaching device 10 includes a cover attaching portion 8 and a cover projecting portion 9, which will be described later. The attaching device 10 can project from the top side of the top plate annular portion 51 toward the lower surface 70 of the cover body 7.

The cap body 3 is a portion in which the stopper 22 is mounted to the mouth 20 of the vial 2 in order to prevent the stopper 22 from being removed from the bottle 21. The cap body 3 includes a tubular body 4 capable of being externally fitted to the mouth 20 of the vial 2, and the top plate 5 having a through hole 50.

The tubular body 4 covers an outer circumferential surface of the mouth 20 when being externally fitted to the mouth 20 of the vial 2. The tubular body 4 of this embodiment has a cylindrical shape. This tubular body 4 has, for example, a uniform outer diameter in the height direction. The outer diameter of the tubular body 4 of this embodiment is substantially equal to the outer diameter of a bottle body 211 of the bottle 21. The tubular body 4 has an inner surface on which a claw is provided for engaging the tubular body 4 with a lower portion of the flange 212 of the bottle 21.

Figure 4:
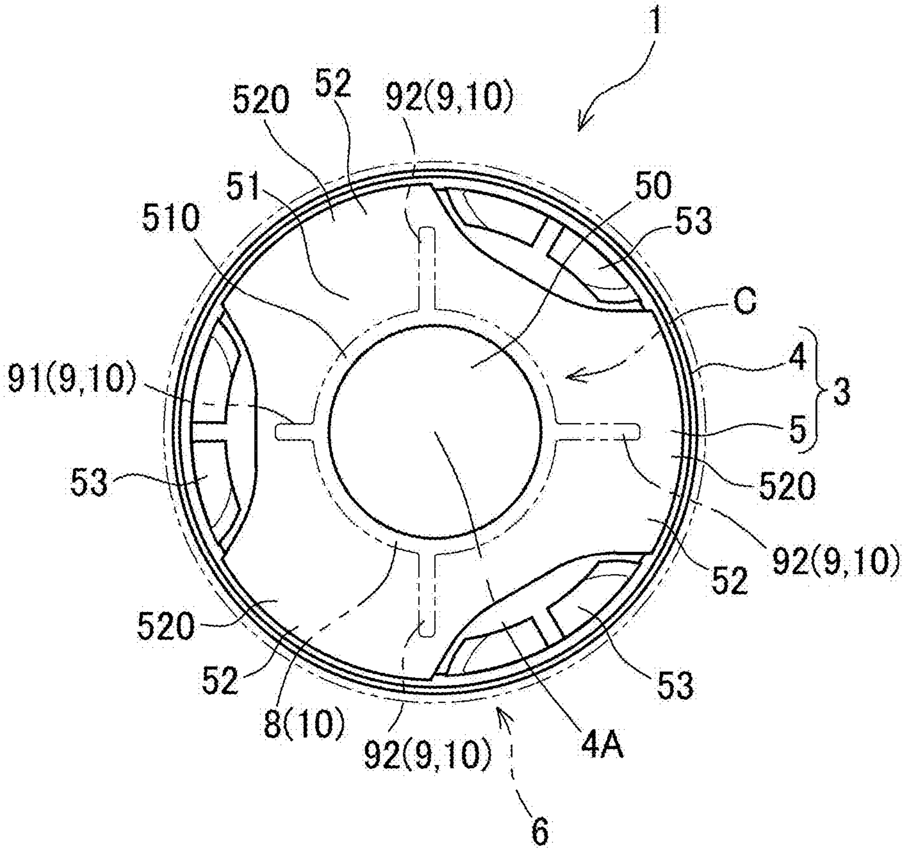
FIG. 4 is a plan view for explaining a cap body, a cover attaching part, and a cover projecting part, in the cap.

The top plate 5 is a portion arranged on the top side of the tubular body 4. In the state where the tubular body 4 is externally fitted to the mouth 20 of the vial 2, the top plate 5 covers the top surface 223 of the stopper 22, for example, the top surface outer circumferential portion 225. Further, as shown in FIG. 4, the top plate 5 includes the top plate annular portion 51 arranged around the through hole 50. The top plate 5 of this embodiment includes a top plate extending portion 52 extending radially outward from the top plate annular portion 51. The top side surface of the top plate 5 is a flat surface.

Figure 6:
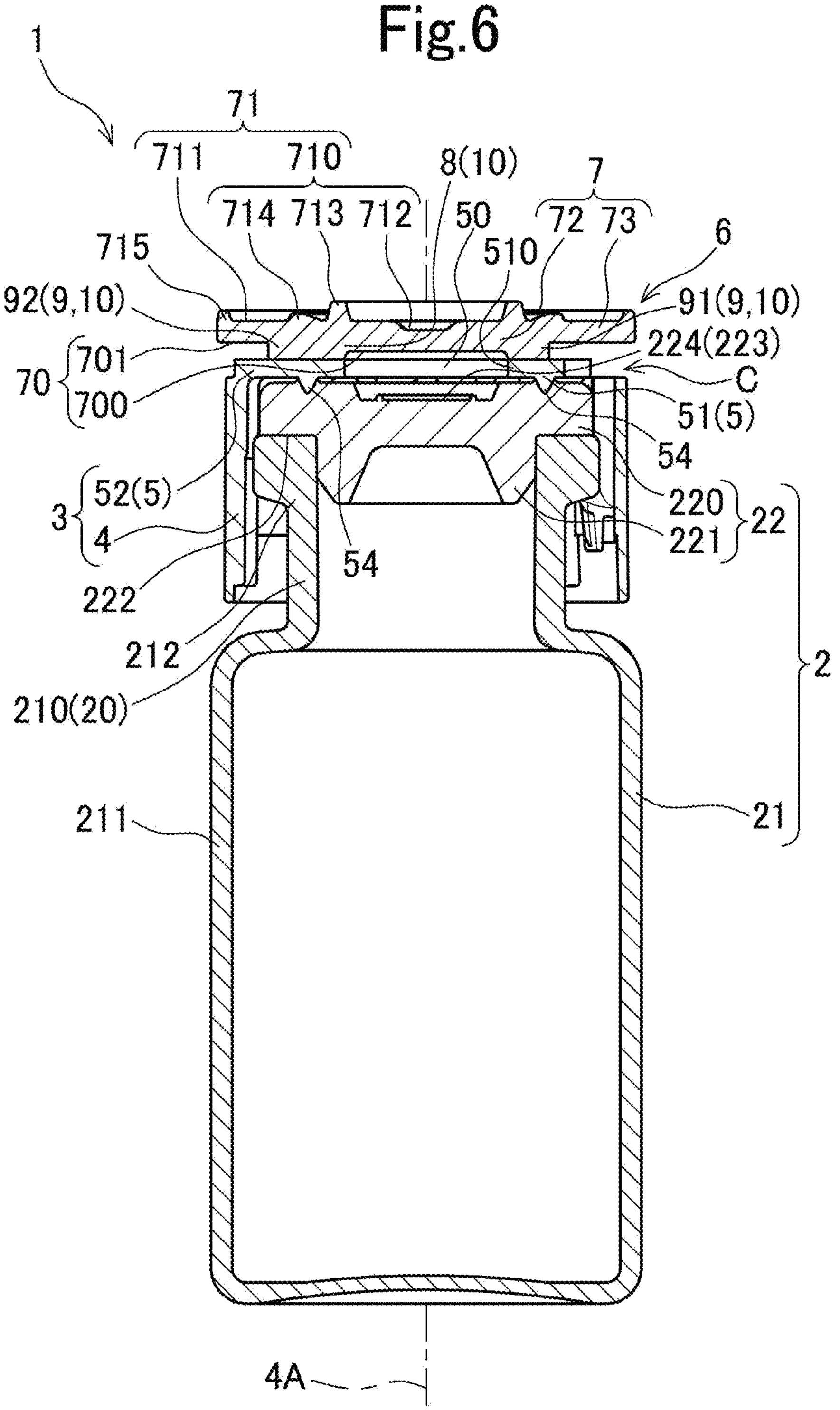
FIG. 6 is a cross-sectional view taken along line VI-VI in FIG. 1.

The through hole 50 is a through hole penetrating through the top plate 5 in the thickness direction (for example the height direction) of the top plate 5. As shown in FIG. 6, the through hole 50 exposes a part of the top surface 223, for example the top surface central portion 224, of the stopper 22, in the state where the tubular body 4 is externally fitted to the mouth 20 of the vial 2. The through hole 50 of this embodiment is arranged at the center of the top plate 5 (for example a central area with a cylinder axis 4A of the tubular body 4 serving as the center).

The top plate annular portion 51 is a portion around the through hole 50. The top plate annular portion 51 has, for example, a circular annular shape with the cylinder axis 4A serving as the center (see FIG. 4). The top plate annular portion 51 of this embodiment is arranged at the center of the top plate 5. Further, the top plate annular portion 51 has a hole edge 510 as an inner end in the radial direction thereof.

The hole edge 510 is a portion that defines the through hole 50. The hole edge 510 has a circular annular shape with the cylinder axis 4A serving as the center.

The top plate 5 of this embodiment has, for example, three top plate extending portions 52 radially extending from the top plate annular portion 51. The top plate extending portions 52 are arranged at equal intervals from each other in the circumferential direction. Each of the top plate extending portions 52 has an extension end 520 connected to the tubular body 4 (for example an end edge located on the top side of the tubular body 4).

The outer circumferential portion of the top plate 5 of this embodiment has a circular shape with a part thereof missing. Specifically, three openings 53 are located at the outer circumferential portion of the top plate 5. The three openings 53 are arranged at equal intervals from each other in the circumferential direction. The top plate extending portions 52 share the same shape.

Further, the top plate 5 of this embodiment includes a top plate projecting portion 54 projecting downward from the lower surface of the top plate annular portion 51. The top plate projecting portion 54 is configured to be forced onto the upper surface of the stopper 22 to thereby prevent the stopper 22 from rotating. In this embodiment, a plurality of the top plate projecting portions 54 are provided. The top plate projecting portions 54 are arranged at equal intervals from each other in the circumferential direction.

With the above configuration, the top plate 5 has a disc shape, has the through hole 50 at the center, and has the outer circumferential portion at which a plurality of openings 53 are arranged at equal intervals from each other in the circumferential direction.

The protective cover 6 is a cover detachably attached to the top side of the top plate 5 (see FIG. 1). The protective cover 6 includes the cover body 7, and the cover attaching portion 8 that is provided as an attaching device 10 for attaching the protective cover 6 and the top plate 5 to each other and that is attached to the top side of the top plate annular portion 51. The protective cover 6 of this embodiment further includes the cover projecting portion 9 provided as the attaching device 10 and arranged radially outside the cover attaching portion 8.

The cover body 7 is a portion that forms an end on the top side of the cap 1. The cover body 7 includes the lower surface 70 arranged away from the top plate 5 with the protective cover 6 attached thereto. In this attached state, the cover body 7 includes a top surface 71 located on the top side. The cover body 7 of this embodiment has an uneven thickness. The cover body 7 includes, for example, a central portion 72 located at the center and having a large thickness and an outer circumferential portion 73 located on an outer circumferential side of the central portion 72 and having a small thickness (see FIG. 2). That is, the cover body 7 includes the central portion 72 located on an inner circumferential side as a thick portion, and the outer circumferential portion 73 located on the outer circumferential side as a thin portion.

The lower surface 70 of this embodiment includes a central lower surface 700 located at the center, and an outer circumferential lower surface 701 located on an outer circumferential side of the central lower surface 700 (see FIG. 6). The lower surface 70 has such a shape that the outer circumferential lower surface 701 is located more on the top side than the central lower surface 700. The cover attaching portion 8 is arranged between the central lower surface 700 and the outer circumferential lower surface 701.

The top surface 71 of this embodiment includes a central top surface 710 located at the center and an outer circumferential top surface 711 located outside the central top surface 710.

The central top surface 710 includes a recessed portion 712 recessed to the lower side, and a projecting portion 713 projecting to the top side. In this central top surface 710, the recessed portion 712 is arranged more on the central side than the projecting portion 713. The central top surface 710 includes an auxiliary projecting portion 714 projecting to the top side and arranged outside the projecting portion 713. The recessed portion 712 has a circular shape (see FIG. 2). The auxiliary projecting portion 714 has an annular shape, for example a circular annular shape. The projecting portion 713 has an annular shape, for example a circular annular shape. The projecting portion 713 of this embodiment is arranged at a position corresponding to the cover attaching portion 8 (i.e., a position overlapping the cover attaching portion 8 as viewed from the height direction) (see FIG. 6).

The outer circumferential top surface 711 includes an edge portion 715 that is an outer circumferential edge portion of the top surface 71 of the cover body 7 and projects to the top side. The edge portion 715 has an annular shape, for example a circular annular shape (see FIG. 2).

Figure 5:
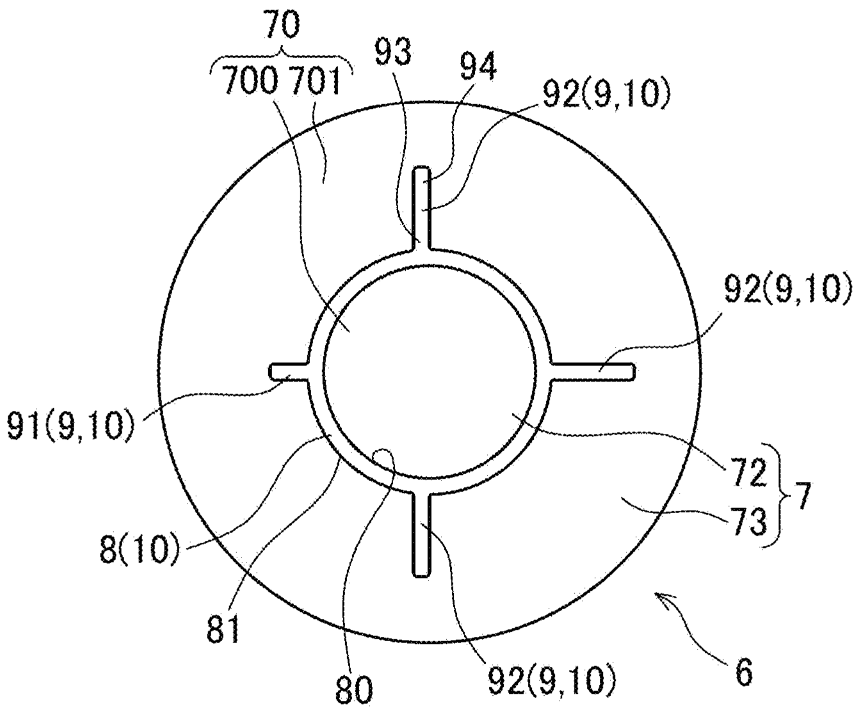
FIG. 5 is a back view of the protective cover in the cap.

As shown in FIG. 5, the attaching device 10 of this embodiment is the cover attaching portion 8 formed in an annular shape around the through hole 50. Further, the cover attaching portion 8 has such a shape as to continue in the circumferential direction and have no interruption across the entire circumference in the circumferential direction. For example, the cover attaching portion 8 has a circular annular shape. The cover attaching portion 8 has a cylindrical shape, and includes an inner circumferential surface 80 and an outer circumferential surface 81. The cover attaching portion 8 of this embodiment has an inner diameter and an outer diameter that are substantially uniform at any portion in the height direction. Further, the cover attaching portion 8 has a constant thickness in the radial direction.

The cover attaching portion 8 is attached to the cap body 3. The cover attaching portion 8 is formed to project from the lower surface 70 of the cover body 7 toward the top side of the top plate annular portion 51 of the top plate 5 and to attach both the lower surface 70 of the cover body 7 and the top side of the top plate annular portion 51 to each other (see FIG. 6).

The cover attaching portion 8 of this embodiment is arranged at a boundary between the central portion 72 and the outer circumferential portion 73 of the cover body 7. The cover attaching portion 8 of this embodiment is attached to the top plate annular portion 51 of the top plate 5 (see FIG. 4). Specifically, the cover attaching portion 8 is attached to the hole edge 510 of the top plate 5 concentrically with the through hole 50. That is, the central axis of the cover attaching portion 8 coincides with the central axis of the through hole 50.

Similar to the cover attaching portion 8, the cover projecting portion 9 projects from the lower surface 70 of the cover body 7 toward the top side of the top plate annular portion 51 of the top plate 5 (see FIG. 6). The cover projecting portion 9 of this embodiment is arranged on the outer circumferential portion 73, which is the thin portion of the cover body 7. The lower surface of the cover projecting portion 9 of this embodiment is flush with the lower surface of the cover attaching portion 8.

The protective cover 6 of this embodiment includes four cover projecting portions 9 (see FIG. 5). The cover projecting portions 9 are arranged at equal intervals from each other in the circumferential direction. That is, the plurality of cover projecting portions 9 are radially arranged.

The cover projecting portions 9 of this embodiment are connected to the cover attaching portion 8, for example, connected to the outer circumferential surface 81 of the cover attaching portion 8. Specifically, the cover projecting portions 9 extend radially outward from the outer circumferential surface 81 of the cover attaching portion 8. The cover projecting portions 9 do not reach the outer edge of the cover body 7, but extend radially outward to an intermediate position of the cover body 7. That is, the cover projecting portions 9 each include a radially inner end 93 continuous with the cover attaching portion 8, and a radially outer end 94 located at the radially outward intermediate position. Each of the cover projecting portions 9 of this embodiment is continuous without interruption from the radially inner end 93 to the radially outer end 94.

For example, each of the cover projecting portions 9 is a rib having a linear shape. Each of the cover projecting portions 9 has a uniform width in a direction orthogonal to a direction in which the cover projecting portion 9 extends. The longitudinal dimensions of the cover projecting portions 9 provided on the protective cover 6 can be equal to each other, or can be different from each other. In the protective cover 6 of this embodiment, a first cover projecting portion 91, which is one of the four cover projecting portions 9, has a shorter longitudinal dimension than that of the other three second cover projecting portions 92. In the protective cover 6, the longitudinal direction of each of the cover projecting portions 9 coincides with the radial direction of the cover body 7.

The cover projecting portions 9 are attached at least to the top plate annular portion 51 of the top plate 5 (see FIG. 4). At least one of the cover projecting portions 9 of this embodiment extends from the top plate annular portion 51 to one of the top plate extending portions 52. Specifically, the first cover projecting portion 91 is attached only to the top plate annular portion 51. The second cover projecting portions 92 extend from the top plate annular portion 51 to the respective top plate extending portions 52 and are attached to the top plate annular portion 51 and the top plate extending portions 52.

In the cap 1 of this embodiment, each of the openings 53 of the top plate 5 is arranged between each two adjacent long cover projecting portions 9 (for example the second cover projecting portions 92).

In the cap 1 configured as above, the cover attaching portion 8 extending in a downward direction from the lower surface 70 of the cover body 7 is attached to the top side of the cap body 3. This configuration allows the lower surface 70 of the cover body 7 to be separated from the top plate 5 and form a gap C around the cover attaching portion 8 (see FIG. 6). That is, the gap C is formed between the protective cover 6 and the cap body 3.

In the cap 1 of this embodiment, the cover attaching portion 8 of the protective cover 6 is arranged on the hole edge 510 of the top plate annular portion 51 of the cap body 3. Thus, the gap C is formed to surround the cover attaching portion 8 (see FIG. 4). Specifically, the gap C is formed in an area radially outside the outer circumferential surface 81 of the cover attaching portion 8 in FIG. 5 except for the areas in which the cover projecting portions 9 extend.

In the cap 1, the material of the protective cover 6 is softer than the material of the cap body 3. Examples of the material of the protective cover 6 include a styrene-based block copolymer and linear low-density polyethylene. Examples of the material of the cap body 3 include a carbonate-based resin and a polypropylene-based resin.

In the cap 1 of this embodiment, it is preferable that the protective cover 6 include a styrene-based block copolymer including a styrene monomer as a constituent unit, in which a content ratio of the styrene monomer is 10 to 60% by mass. In the cap 1 of this embodiment, it is preferable that the cap body 3 include a carbonate-based resin.

Examples of the carbonate-based resin included in the cap body 3 include an aromatic carbonate-based resin and an aliphatic carbonate-based resin. Examples of the aromatic carbonate-based resin include a polymer of an aromatic dihydroxy compound and phosgene ($COCl_2$), and a polymer of an aromatic dihydroxy compound and a carbonic acid diester. The polymer of an aromatic dihydroxy compound and phosgene can be obtained by, for example, the interfacial polymerization method of an aromatic dihydroxy compound and phosgene. The polymer of an aromatic dihydroxy compound and a carbonic acid diester can be obtained by, for example, transesterification reaction between an aromatic dihydroxy compound and a carbonic acid diester. Examples of the aromatic dihydroxy compound include bisphenol A, dimethylbisphenol A, bisphenol Z, and 1,1-bis(4-hydroxyphenyl)-3,3,5-trimethylcyclohexane. Examples of the carbonic acid diester include diphenyl carbonate. As the carbonate-based resin, a conventionally known carbonate-based resin can be used without impairing the effect of the present invention. The mass average molecular weight of the carbonate-based resin is preferably 10,000 or more, more preferably 20,000 or more. The upper limit of the mass average molecular weight of the carbonate-based resin is not particularly limited, but the mass average molecular weight of the carbonate-based resin is preferably 1 million or less. In this embodiment, the mass average molecular weight can be measured by the gel permeation chromatography (GPC) method and determined in terms of polystyrene. The cap body 3 can include, in addition to the carbonate-based resin, a known material as a material of the cap body 3 without impairing the effect of the present invention. The cap body 3 has a brittle temperature of preferably −70° C. or less, more preferably −100° C. or less. In this embodiment, the brittle temperature can be measured according to JIS K7216-1980.

The cap body 3 includes preferably 51 to 100% by mass, more preferably 80 to 100% by mass, of the carbonate-based resin.

The protective cover 6 is formed of the protective cover composition of this embodiment. That is, the protective cover 6 has the same composition ratio as that of the protective cover composition of this embodiment. It is preferable that the protective cover composition of this embodiment include a styrene-based block copolymer (component A) including a styrene monomer as a constituent unit, in which a content ratio of the styrene monomer is 10 to 60% by mass. It is preferable that the protective cover composition of this embodiment include an olefin-based resin (component B). It is preferable that the protective cover composition of this embodiment include a lubricant (component C).

Component A (Styrene-Based Block Copolymer Having a Content Ratio of the Styrene Monomer of 10 to 60% by Mass)

The component A is a styrene-based block copolymer, and has a content ratio of the styrene monomer to the styrene-based block copolymer (also referred to simply as "styrene content ratio") of 10 to 60% by mass. The protective cover 6 having a styrene content ratio of 10 to 60% by mass becomes hardly brittle even under low temperature (for example −85° C. or less), adheres to the cap body to a reasonable extent, and can be removed from the cap body with moderate force at the time of removal. The styrene-based block copolymer is preferably an elastomer.

The component A is not particularly limited as long as it has a styrene content ratio of 10 to 60% by mass. The component A is a block copolymer having one or more, preferably two or more in terms of mechanical characteristics, polymer blocks X mainly including a constituent unit derived from a styrene skeleton-containing compound, and one or more polymer blocks Y mainly including a constituent unit derived from a conjugated diene compound. Examples of the component A include a block copolymer having a structure such as X—Y, X—Y—X, Y—X—Y—X, or X—Y—X—Y—X. As the component A, a hydrogenated product of the block copolymer having the above structure, or a mixture thereof can be preferably used. That is, the component A conceptually includes a hydrogenated product as well.

The hydrogenated product of the styrene-based block copolymer having the above structure is obtained by adding hydrogen to the carbon-carbon double bond in the styrene-based block copolymer having the above structure to form a carbon-carbon single bond. The above hydrogenation can be carried out by a known method, for example, by subjecting the styrene-based block copolymer having the above structure to hydrogen treatment using a hydrogenation catalyst in an inert solvent.

The styrene skeleton-containing compound is a polymerizable monomer having a polymerizable carbon-carbon double bond and an aromatic ring. Examples of the above styrene skeleton-containing compound include styrene, t-butylstyrene, α-methylstyrene, divinylbenzene, 1,1-diphenylstyrene, N,N-diethyl-p-aminoethyl styrene, p-tertiary butylstyrene, and an alkylstyrene in which at least one of alkyl groups having 1 to 8 carbon atoms is bonded to a benzene ring. Among these, styrene and an alkylstyrene in which at least one of alkyl groups having 1 to 8 carbon atoms is bonded to a benzene ring are preferable. As the above styrene skeleton-containing compound, one or more of these can be used.

The above conjugated diene compound is a polymerizable monomer having a structure in which two carbon-carbon double bonds are bonded by one carbon-carbon single bond. Examples of the above conjugated diene compound include 1,3-butadiene, isoprene (2-methyl-1,3-butadiene), 2,3-dimethyl-1,3-butadiene, and chloroprene (2-chloro-1,3-butadiene). Among these, 1,3-butadiene and isoprene are preferable. As the above conjugated diene compound, one or more of these can be used.

In terms of low-temperature characteristics (cold resistance), the protective cover 6 has a styrene content ratio of the styrene-based block copolymer (which conceptually includes a hydrogenated product as well) as the component A that is preferably 10 to 60% by mass, and more preferably 20 to 50% by mass. In terms also of adhesiveness to the cap body, removability from the cap body, or the like, the protective cover 6 has a styrene content ratio of the styrene-based block copolymer (which conceptually includes a hydrogenated product as well) as the component A that is preferably 10 to 60% by mass, more preferably 20 to 50% by mass.

Examples of the styrene-based block copolymer include a styrene-butadiene-styrene block copolymer (SBS), and a styrene-isoprene-styrene block copolymer (SIS). Examples of the hydrogenated product among the above styrene-based block copolymers include a styrene-ethylene-butene copolymer (SEB), a styrene-ethylene-propylene copolymer (SEP), a styrene-ethylene-butene-styrene copolymer (SEBS), a styrene-ethylene-propylene-styrene copolymer (SEPS), and a styrene-ethylene-ethylene-propylene-styrene copolymer (SEEPS). The listed styrene-based block copolymers can be individually used, or two or more of these can be used as a mixture.

The mass average molecular weight of the styrene-based block copolymer (which conceptually includes a hydrogenated product as well) as the component A is preferably 50,000 to 500,000. It is more preferably 80,000 to 450,000, still more preferably 100,000 to 400,000. Good processability and moldability are obtained within this range. The mass average molecular weight herein can be measured by the gel permeation chromatography (GPC) method and determined in terms of polystyrene.

The protective cover 6 includes preferably 50 to 100% by mass, more preferably 70 to 100% by mass, of the styrene-based block copolymer as the component A.

Component B (Olefin-Based Resin)

The component B is an olefin-based resin. The component B is effective in increasing fluidity of the protective cover composition of this embodiment for improved moldability and adjusting hardness of the composition.

Examples of the component B include an ethylene-based resin, a propylene-based resin, and a 1-butene-based resin. Examples of the ethylene-based resin include a homopolymer and a copolymer, of ethylene. Examples of the homopolymer include low-density polyethylene, linear low-density polyethylene, and high-density polyethylene. Examples of the copolymer include copolymers of ethylene and other α-olefins (e.g., propylene, 1-butene, 1-hexene, 4-methyl-1-pentene, 1-octene). Examples of the propylene-based resin include a homopolymer and a copolymer, of propylene. Examples of the copolymer include random copolymers and block copolymers, of propylene and other α-olefins (e.g., ethylene, 1-butene, 1-hexene, 4-methyl-1-pentene, 1-octene). Among these, an ethylene-based resin and a propylene-based resin are preferably used.

When the component B is included in the protective cover composition of this embodiment, the mixing amount of the component B is preferably 200 parts or less by mass, more preferably 5 to 100 parts by mass, still more preferably 8 to 80 parts by mass, based on 100 parts by mass of the component A. The component B included in an amount of 200 parts or less by mass allows the protective cover to easily maintain its strength at a low temperature. The component B does not have to be included in the protective cover composition of this embodiment.

Component C (Lubricant)

The component C is a lubricant. The protective cover composition of this embodiment preferably includes the component C in terms of the adhesiveness of the protective cover to the cap body and the removability of the protective cover from the cap body.

The component C is not particularly limited, and examples of the component C include a paraffin-based lubricant, a hydrocarbon resin-based lubricant, a fatty acid-based lubricant, a fatty acid amide-based lubricant, a fatty acid ester-based lubricant, a fatty acid ketone-based lubricant, and a silicone-based lubricant. Among these, a fatty acid amide-based lubricant is preferably used.

The mixing amount of the component C is preferably 0.1 to 3 parts by mass, more preferably 0.3 to 1 parts by mass, based on 100 parts by mass of the component A. When the component C falls within this range, a favorable balance is obtained between the adhesiveness of the protective cover to the cap body and the removability of the protective cover from the cap body.

Other Components

In addition to the above components, the protective cover composition for the cap of the present invention can include, for example, other polymer components, a softening agent for rubber, an anti-blocking agent, a heat stabilizer, an antioxidant, an ultraviolet absorber, a colorant, a thickener, an anti-aging agent, and a filler, without impairing the characteristics of the present invention.

The cap 1 is integrally molded by the insert molding method or the two-color molding method. For example, after the cap body 3 is molded by the injection molding method, the cap body 3 is inserted into a protective cover injection molding mold for molding the protective cover 6, to mold the protective cover 6 by the injection molding method. It is also possible that after the protective cover 6 is molded, the protective cover 6 is inserted into a mold for molding the cap body 3 to mold the cap body 3 by the injection molding method.

Such a cap 1 is mounted to the vial 2 as follows. First, liquid medicine is contained in the bottle 21 of the vial 2, and the stopper 22 while being internally fitted to the mouth 20 of the vial 2 is pressed downward, that is, mounted to the bottle 21 by being crimped onto the bottle 21. Further, with the cap body 3 externally fitted to the mouth 20 of the vial 2, the protective cover 6 is pressed downward, that is, mounted to the vial 2 by crimping the cap 1 onto the vial 2. The crimping of the stopper 22 and the cap 1 is performed, for example, using an automatic capping apparatus.

To remove the protective cover 6 of the cap 1 mounted to the vial 2, a user places his or her finger in a gap between the cover body 7 and the cap body 3 to pinch the outer circumferential portion 73. The cover body 7 has the outer circumferential portion 73 having a small thickness, which is easily bent (easily turned over) and thus allows the cover body 7 to begin being easily peeled off. The cover attaching portion 8 is peeled off by continuously peeling off the cover body 7 in the radial direction toward the center side, for example, by holding (pinching) and pulling up the outer circumferential portion 73 that has been turned over. In the case where the cover projecting portions 9 are arranged, the cover projecting portions 9 are peeled off continuously starting from the radially outer ends 94 toward the radially inner ends 93, and further the cover attaching portion 8 is peeled off starting from the radially inner ends 93 of the cover projecting portions 9, followed by the central portion 72 of the cover body 7 also being peeled off. That is, the cover projecting portions 9 are the portions that trigger the peeling-off of the cover attaching portion 8. The cover attaching portion 8 is to be peeled off at once since the central portion 72 of the cover body 7 has a large thickness and is hardly bent.

According to the cap 1 as described above, the cover attaching portion 8 projecting from the lower surface 70 of the cover body 7 of the protective cover 6 toward to the top side of the top plate annular portion 51 allows the lower surface 70 of the cover body 7 to be separated from the top plate 5 with the protective cover 6 attached to the cap body 3 and form the gap C around the cover attaching portion 8. This configuration allows the user to easily place his or her finger on the protective cover 6 in the gap C to pinch the protective cover 6 for operation, and thus allows the user to easily peel off the protective cover 6 from the cap body 3. Moreover, since the cover attaching portion 8 has an annular shape, the cover attaching portion 8 extending in an annular shape from the lower surface 70 of the cover body 7 surrounds the through hole 50 of the cap body 3 in the state where the protective cover 6 is attached to the cap body 3, so that a portion of the stopper 22 exposed through the through hole 50 can be closed to prevent contamination. The top side surface of the top plate 5 of the cap body has a flat surface with no projection or recess, and thus can be easily wiped with alcohol cotton without causing fluffing after the protective cover 6 is peeled off therefrom, which is hygienic.

In the cap 1 of this embodiment, the cover projecting portions 9 are arranged under the cover body 7 and radially outside the cover attaching portion 8. Thus, when, for example, a plurality of the caps 1 are packed in a box or a bag for transporting, the cover projecting portions 9 of one of the caps 1 can prevent an end portion of the protective cover 6 of another cap 1 from entering the gap C of the one cap 1 between the protective cover 6 and the top plate 5 of the cap body 3. This can prevent the protective cover 6 of the one cap 1 from being forcibly opened by another cap 1.

In the cap 1 of this embodiment, the cover projecting portions 9 extend to be continuous with the cover attaching portion 8 on the radially outside of the cover attaching portion 8. Thus, when the protective cover 6 is peeled off from the cap body 3, the force of peeling off the protective cover 6 is sequentially transmitted from the cover projecting portions 9 to the cover attaching portion 8 to thereby enable the protective cover 6 to be smoothly peeled off.

Further, in the cap 1 of this embodiment, the top plate annular portion 51 is arranged at the center of the top plate

5, which allows the gap C to be uniformly provided around the cover attaching portion 8. This configuration allows the protective cover 6 to be easily peeled off from the cap body 3 by placing a finger of the user on any area in the circumferential direction of the outer peripheral portion of the protective cover 6.

In the cap 1 of this embodiment, the top plate annular portion 51 has a hole edge 510 defining the through hole 50, and the cover attaching portion 8 is attached to the hole edge 510. This configuration sufficiently increases the distance between the circumferential edge of the protective cover 6 and the cover attaching portion 8 (that is, increases the gap C arranged around the cover attaching portion 8). This configuration allows the outer circumferential portion 73 of the cover body 7 to be easily turned over and allow the cover attaching portion 8 to be subjected to a large force when the protective cover 6 is being peeled off. The protective cover 6 is thereby easily peeled off from the cap body 3.

In the cap 1 of this embodiment, the projecting portion 713 on the top surface of the protective cover 6 (for example, the top surface 71 of the cover body 7) is provided in an area corresponding to the cover attaching portion 8. Thus, the portion of the protective cover 6 to be placed on the top side of the top plate annular portion 51 has the cover attaching portion 8 and the projecting portion 713, which together make the portion of the protective cover 6 to have a large thickness. This allows the protective cover 6 to be hardly damaged even when the projecting portion 713 is pressed at the top plate at the time of crimping the cap 1 onto the vial 2.

Further, in the cap 1 of this embodiment, the cover projecting portions 9 are arranged at equal intervals from each other in the circumferential direction, that is, arranged uniformly in the circumferential direction. Thus, an intrusion of the protective cover 6 of one cap 1 into the gap C of another cap 1 between the protective cover 6 and the top plate 5 of the cap body 3 can be effectively prevented, and thereby the mutual engagement of the caps 1 or an accidental peeling-off of the protective cover 6 can be prevented.

In the cap 1 of this embodiment, the edge portion 715 projecting to the top side is provided as the outer circumferential edge portion of the top surface 71 of the cover body 7. Thus, when, for example, a plurality of the caps 1 are packed in a box or a bag for transporting, the intrusion of an end of one of the caps 1 into the gap C of another cap 1 between the protective cover 6 and the top plate 5 of the cap body 3 hardly occurs due to the thick outer circumferential portion 73 of the cover body 7. Further, the height from the outer circumferential lower surface 701 to the leading end of the edge portion 715 that is greater than the height of the cover attaching portion 8 or the height of the gap C can more effectively prevent the intrusion.

In the cap 1 of this embodiment, the central top surface 710 includes the auxiliary projecting portion 714 projecting to the top side and arranged outside the projecting portion 713. The auxiliary projecting portion 714 thus allows the force of peeling off the protective cover 6 to be easily and smoothly transmitted, and enables adjustment of the strength of the protective cover 6 itself.

The protective cover composition of this embodiment is used for preparing a cap to be mounted to a vial with its mouth closed by a stopper. Specifically, the protective cover composition of this embodiment is used for preparing the protective cover. It is important that the protective cover composition of this embodiment includes a styrene-based block copolymer including a styrene monomer as a constituent unit, in which a content ratio of the styrene monomer is 10 to 60% by mass.

It is a matter of course that the cap of the present invention is not limited to the aforementioned embodiment, but various modifications can be made without departing from the gist of the present invention. For example, a configuration of an embodiment may be added to a configuration of another embodiment, and part of a configuration of an embodiment may be replaced by a configuration of another embodiment. Further, part of a configuration of an embodiment may be deleted.

The attaching device 10 of the aforementioned embodiment includes the cover attaching portion 8 and the cover projecting portions 9, which project from the lower surface 70 of the cover body 7 to the top side of the top plate annular portion 51 of the top plate 5, but can include only the cover attaching portion 8. In this case, for example, it is conceivable that the protective cover 6 includes the cover body 7, and the cover attaching portion 8 having an annular shape. Even in this case, the user can easily place his or her finger on the protective cover 6 in the gap C around the cover attaching portion 8 in the state where the protective cover 6 is attached to the cap body 3, and can easily peel off the protective cover 6 from the cap body 3. Moreover, since the cover attaching portion 8 has an annular shape, the cover attaching portion 8 surrounds the through hole 50 of the cap body 3 in the state where the protective cover 6 is attached to the cap body 3, so that a portion of the stopper 22 exposed through the through hole 50 can be closed.

The attaching device 10 can include a cover attaching portion or a cover projecting portion projecting toward the lower surface 70 of the cover body 7 on the top side of the top plate annular portion 51 of the top plate 5. This cover attaching portion is configured to allow the top side of the top plate annular portion 51 of the top plate 5 and the lower surface 70 of the cover body 7 to be attached to each other.

Figure 7:
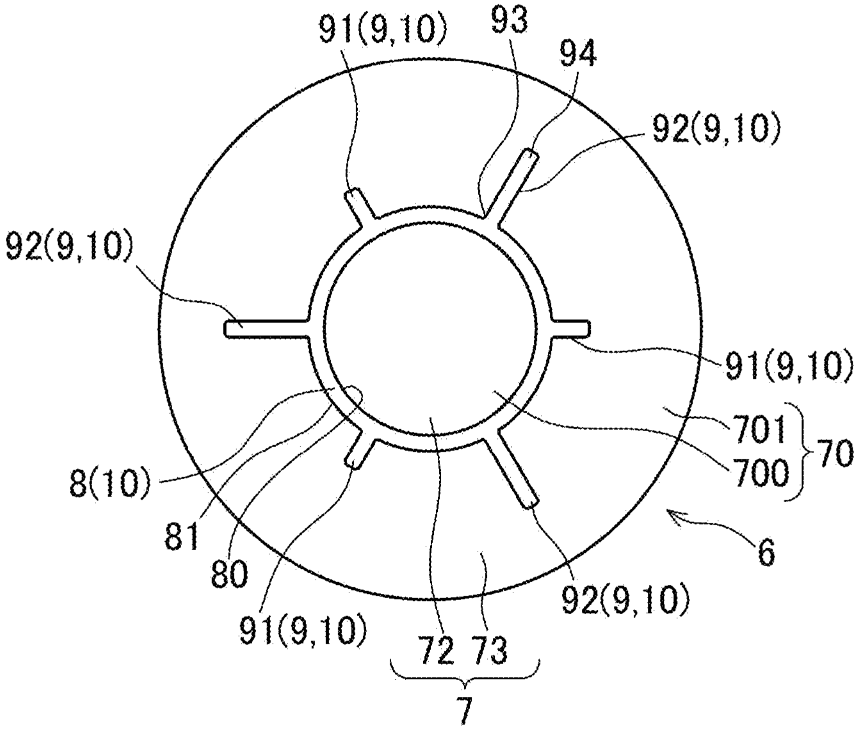
FIG. 7 is a back view of a protective cover in a cap according to a modified example.

The protective cover 6 of the aforementioned embodiment includes the four cover projecting portions 9, but it is essential to include at least one cover projecting portion 9. For example, as shown in FIG. 7, it is conceivable that the protective cover 6 includes six cover projecting portions 9. The plurality of cover projecting portions 9 extend radially. The plurality of cover projecting portions 9 include a first cover projecting portion 91 having a small length in the longitudinal direction, and a second cover projecting portion 92 having a large length in the longitudinal direction.

Figure 8:
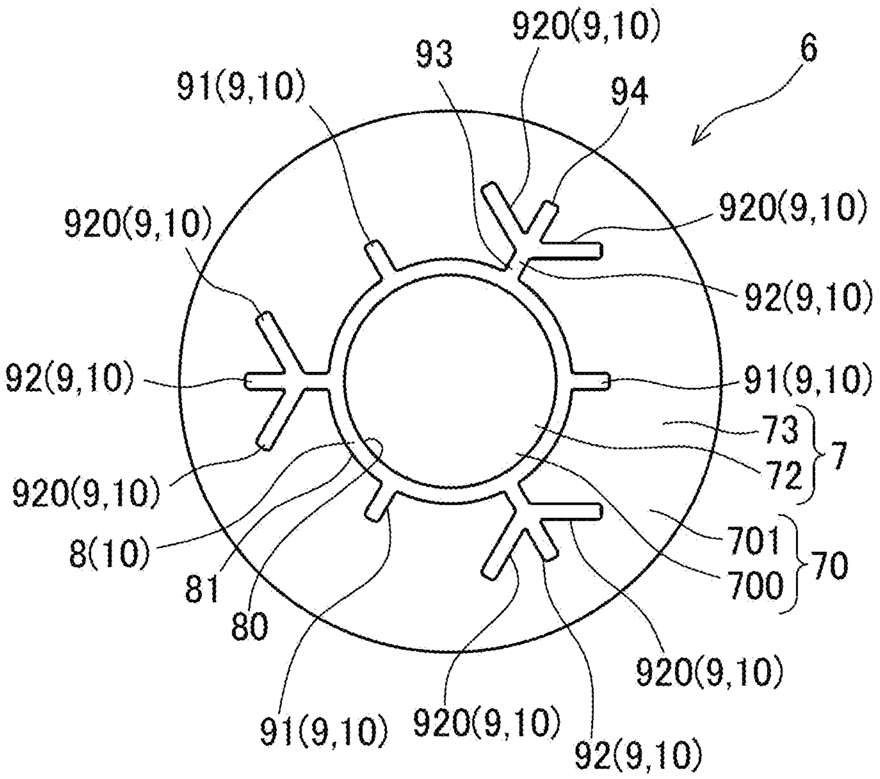
FIG. 8 is a back view of a protective cover in a cap according to a modified example.

In the protective cover 6 of the aforementioned embodiment, the cover projecting portions 9 each have a linear shape extending radially outward, but can have a curved shaped or a meander shape extending radially outward. Further, as shown in FIG. 8, the cover projecting portions 9 can extend in a direction other than the radially outward direction. For example, it is conceivable that a cover projecting portion 9 extending in a radial direction has another cover projecting portion 9 extending in another direction therefrom. Specifically, it is conceivable that an auxiliary projecting portion 920 as the cover projecting portion 9 further extends in a branch shape from the second cover projecting portion 92 having a large length. Such an auxiliary projecting portion 920 in a branch shape allows the cover projecting portions 9 of one cap 1 to securely prevent an end portion of the protective cover 6 of another cap 1 from entering the gap C of the one cap 1 between the protective cover 6 and the top plate 5 of the cap body 3.

The auxiliary projecting portion 920 extends from a position between the radially inner end portion 93 and the radially outward position 94 of the second cover projecting portion 92, in a direction crossing the direction in which the second cover projecting portion 92 extends. Specifically, the auxiliary projecting portion 920 extends from the second cover projecting portion 92 to both sides in a width direction of the second cover projecting portion 92 (for example, a direction orthogonal to the longitudinal direction of the second cover projecting portion 92).

Figure 9:
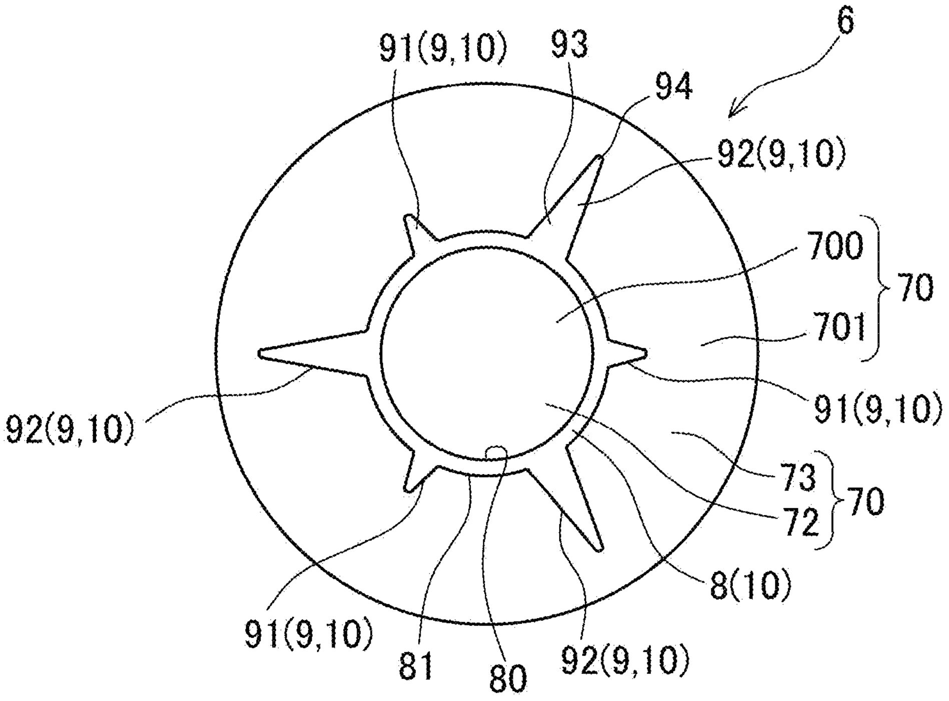
FIG. 9 is a back view of a protective cover in a cap according to a modified example.

In the protective cover 6 of the aforementioned embodiment, each of the cover projecting portions 9 has a uniform width, but the width can be non-uniform. For example, as shown in FIG. 9, the cover projecting portion 9 can have a smaller width as it advances radially outward. That is, the covering projecting portion 9 can have a tapered shape. Specifically, it is conceivable that the cover projecting portion 9 has larger width as it is closer to the radially inner end portion 93 and has smaller width as it is closer to the radially outward end portion 94. The cover projecting portions 9 having such a tapered shape can require only a small force when the protective cover 6 begins being removed. The configuration that the width of the cover projecting portions 9 gradually increase as the cover projecting portions 9 advance radially outward allows the force of peeling off the protective cover 6 to be smoothly transmitted to the protective cover 6.

In the protective cover 6 of the aforementioned embodiment, the cover projecting portions 9 extend to be continuous with the cover attaching portion 8, but can extend not to be continuous with the cover attaching portion 8.

In the protective cover 6 of the aforementioned embodiment, the cover attaching portion 8 has a cylindrical shape, but can have a different shape such as an elliptical tubular shape or a polygonal tubular shape. The cover attaching portion 8 can have such a shape as to have a plurality of rings overlapped with each other, such as a double-ring shape.

The cover attaching portion 8 projects downward from the lower surface 70 of the cover body 7, but can project from the lower surface 70 in the downward direction. For example, it is conceivable that the cover attaching portion 8 projects downward in a curved state from the lower surface 70 of the cover body 7, or projects obliquely downward from the lower surface 70. The cover attaching portion 8, if provided to project obliquely downward from the lower surface 70 of the cover body 7, has a tapered tubular shape.

In the protective cover 6 of the aforementioned embodiment, the lower surface 70 of the cover body 7 has such a shape as to have the outer circumferential lower surface 701 located more on the top side than the central lower surface 700, but can further have such a shape as to have the outer circumferential edge of the outer circumferential lower surface 701 projecting further downward than other portions of the lower surface 70. In this case, when, for example, a plurality of the caps 1 are packed in a box or a bag for transporting, the outer circumferential edge portion of the outer circumferential lower surface 701 of the cover body 7 of one of the caps 1 can prevent an end portion of the protective cover 6 of another cap 1 from entering the gap C of the one cap 1 between the protective cover 6 and the cap body 3.

In the cap body 3 of the aforementioned embodiment, the top plate 5 has a disc shape, has the through hole 50 at the center, and has the openings 53 arranged at equal intervals from each other in the circumferential direction, but can have any shape as long as it has the through hole 50. For example, in the top plate 5 of the aforementioned embodiment, three top plate extending portions 52 extend from the top plate annular portion 51, but it is essential that at least one top plate extending portion 52 other than the three extend therefrom.

Figure 10:
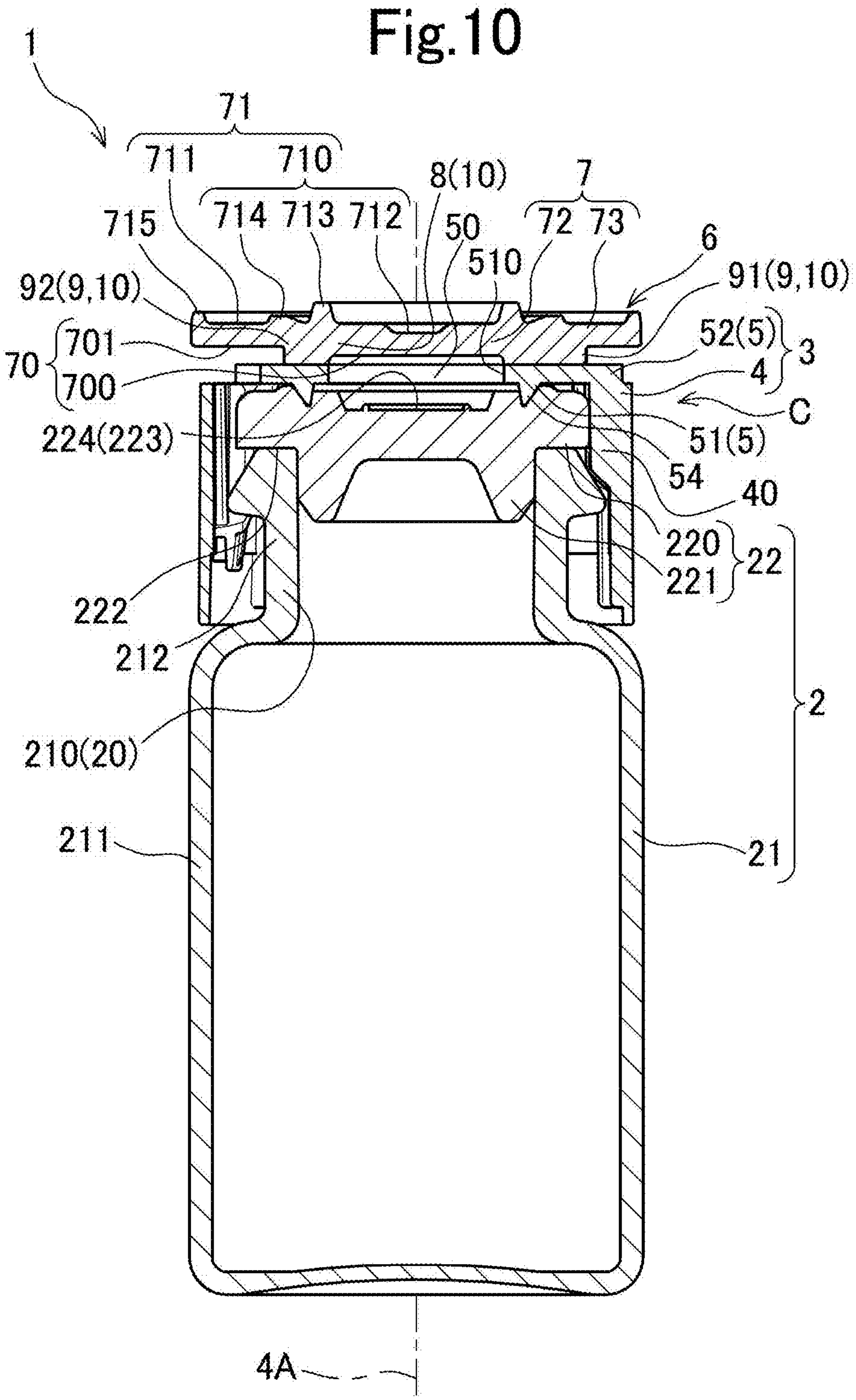
FIG. 10 is a cross-sectional view of a vial to which a cap according to a modified example is mounted.
Figure 11:
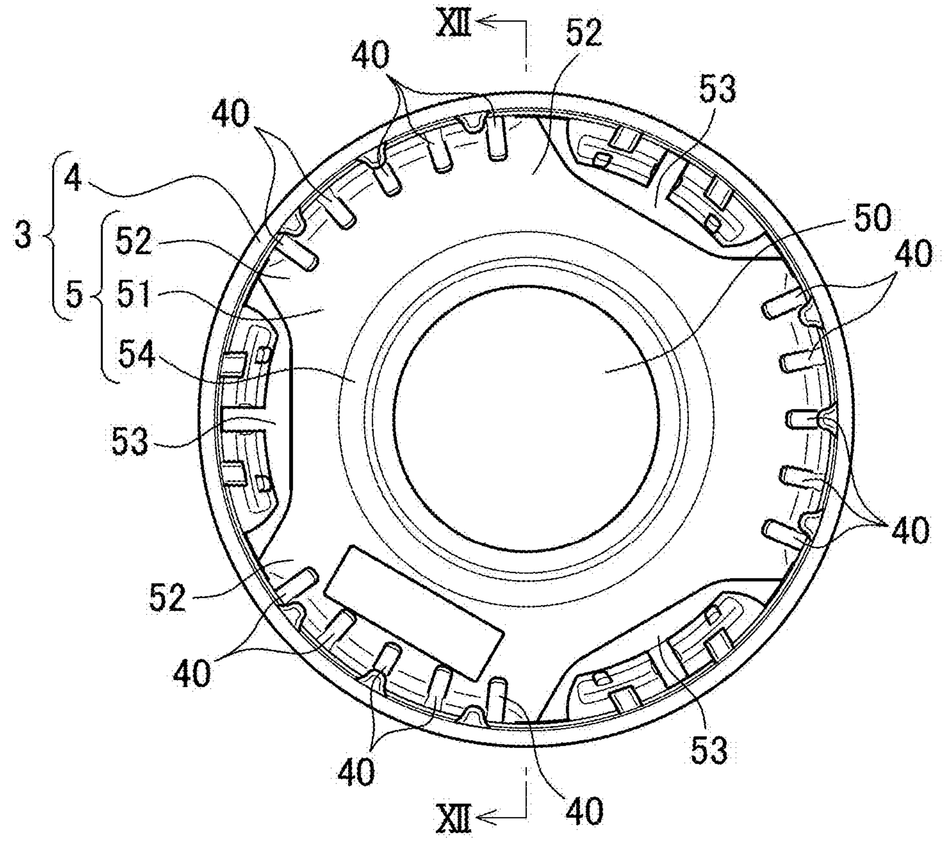
FIG. 11 is a bottom view of the cap according to the modified example.
Figure 12:
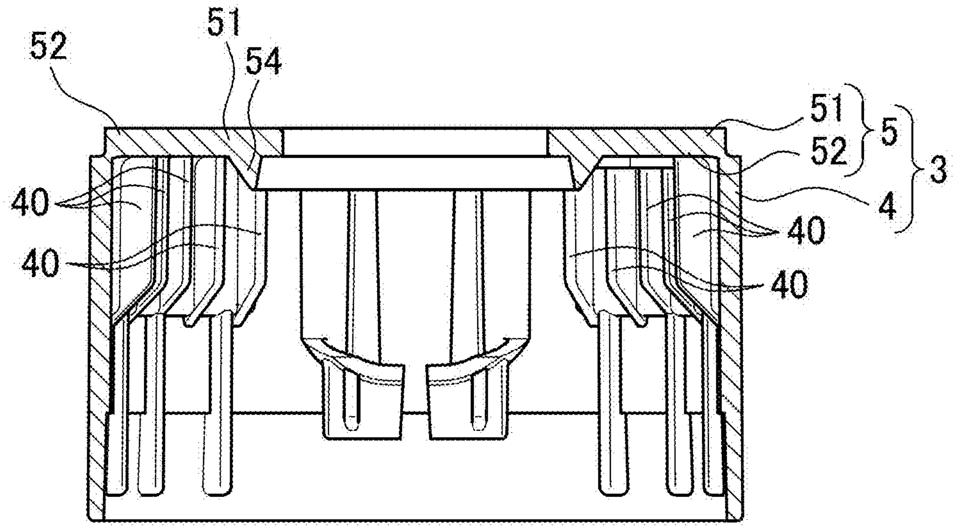
FIG. 12 is a cross-sectional view taken along line XII-XII in FIG. 11.

As shown in FIG. 10 to FIG. 12, the configuration can be such that a plurality of vertical ribs 40 extending downward are provided on the inner circumferential surface of the tubular body 4 of the cap body 3. The cap body 3 includes a plurality of groups of vertical ribs 40 each formed by a plurality of vertical ribs 40 (hereinafter referred to as vertical rib groups), and the plurality of vertical rib groups are arranged on the inner circumferential surface of the tubular body 4 at intervals from each other in the circumferential direction. Specifically, the plurality of vertical rib groups are arranged at three positions (i.e., three positions corresponding respectively to the top plate extending portions 52) on the inner circumferential surface of the tubular body 4 at equal intervals from each other in the circumferential direction, and each of the plurality of vertical rib groups includes five vertical ribs 40.

Each of the plurality of vertical ribs 40 is a vertically elongated rib projecting radially inward from the inner circumferential surface of the tubular body 4. The vertical rib 40 extends downward from the upper end of the tubular body 4. The upper end of the vertical rib 40 is continuous with the top plate extending portion 52. The lower end of the vertical rib 40 has a tapered shape having a smaller projecting height as it advances downward. The vertical ribs 40 share the same dimension in the radial direction (i.e., share the same amount of projection in the radially inward direction). The diameter of a virtual circle passing through end edges in the radially inward direction (i.e., leading end edges in the projecting direction) of the vertical ribs 40 is smaller than the outer diameter of the stopper 22. That is, the vertical ribs 40 are configured to bring their leading end edges into contact with the outer circumferential portion of the stopper 22 when the stopper 22 is inserted into the tubular body 4. Thus, the elastically deformable stopper 22 is press-fitted into the tubular body 4 to cause the vertical ribs 40 to be forced onto the outer circumferential portion of the stopper 22, so that the stopper 22 can be held in the cap body 3. As described above, such vertical ribs 40 that allow the stopper 22 to be press-fitted into the tubular body 4 and thereby held therein enable the crimping onto the vial 2 in the state where the stopper 22 is held in the cap 1. That is, this configuration enables one-time crimping when medicine is contained in the vial 2 and the cap 1 is fitted into the vial 2.

Further, the top plate 5 of the aforementioned embodiment includes the plurality of top plate projecting portions 54 for rotation prevention, but can include one top plate projecting portion 54. In this case, as shown in FIG. 12, it is conceivable that the top plate projecting portion 54 is formed into an annular shape surrounding the through hole of the top plate 5. In this configuration, the top plate projecting portion 54 for rotation prevention that is formed into an annular shape across its entire circumference brings the space between the protective cover 6 and the top plate central portion 224 of the stopper 22 into a tightly closed state to be thereby capable of securing sterility of the top plate central portion 224 of the stopper 22 until use.

The chemical agent to be contained in the vial 2 of the aforementioned embodiment is liquid medicine, but can be a freeze-dried chemical agent. In this case, if the freeze-dried chemical agent is used, a diluent or a solvent is added to the chemical agent to bring the agent back to a liquid form, which can be administered to a patient.

EXAMPLES

Next, the present invention will be described more specifically by way of Examples and Comparative Examples.

Examples and Comparative Examples

After a cap body was molded by the injection molding method, the cap body was inserted into a protective cover injection molding mold for molding a protective cover, to mold the protective cover by the injection molding method using a protective cover composition. The caps of the Examples and the Comparative Examples were thus prepared. The protective covers (the protective cover compositions) and the cap bodies were prepared to respectively have the compositions shown below and in Table 1 below. The caps were prepared to have such shapes as shown below and in Table 1 below, and to have such a size as to be mountable to a vial (volume: 10 mL).

Composition of Protective Cover (A) Styrene-based block copolymer (styrene content ratio: 10 to 60% by mass)

(A-1) SBS: Styrene-butadiene-styrene block copolymer (styrene content ratio: 40% by mass) (TR-2000, manufactured by JSR Corporation)

(A-2) SEBS: styrene-ethylene-butene-styrene block copolymer (styrene content ratio: 33% by mass) (SEPTON 8006, manufactured by KURARAY CO., LTD.)

(B) Olefin-based resin (B-1) HDPE: High-density polyethylene (NOVATEC HD HJ490, manufactured by Japan Polyethylene Corporation)

(C) Lubricant (C-1) Fatty acid amide-based lubricant (isostearyl amide) (INCROSLIP SL, manufactured by Croda)

Composition of Cap Body

PC: Carbonate-based resin

Cap Shape

A: Shape shown in FIGS. 1 to 6

B: Shape shown in FIGS. 1 to 4 of WO 2015/029580 A (DuPont Type Impact Test (Temperature Conditions: −85° C., 23° C.))

The cap was subjected to an impact using a DuPont type impact tester (JIS K5600-5-3: 1999) to visually check the conditions of the protective cover of the cap. Specifically, the cap was first placed on a flat plane under −85° C. or 23° C. for 30 minutes. Shortly afterwards, a die (round type, radius: 6 mm) was placed on the protective cover of the cap, and a 300 g weight was dropped onto the die from a height of 500 mm. Then, the conditions of the protective cover of the cap were visually evaluated based on the following criteria:

○: Did not change.

x: Cracking or chipping occurred.

Table 1 below shows the results.

(Peeling Test 1)

The cap was mounted to a vial (volume: 10 mL) with its mouth closed by a rubber stopper. Next, the protective cover was peeled off by hand from the capped vial, and evaluated based on the following criteria:

○: The protection cover was cleanly peeled off with no large force.

x: The protective cover had a chip, or a part of the protective cover remained on the cap body. (Large force was required to peel off the protective cover.)

Table 1 below shows the results.

(Peeling Test 2)

The cap was mounted to a vial (volume: 10 mL) with its mouth closed by a rubber stopper. Next, two holes were made through the protective cover, and a wire was caused to pass through the holes to hook the protective cover therethrough. Then, the capped vial was set on a push-pull gauge and the protective cover was pulled off the capped vial with the wire (speed: 60 mm/min) to read the maximum force required for peeling off the protective cover (referred to also as "flip-off force"). This measurement was performed five times. Table 1 below shows the average values, the maximum values, and the minimum values, of the flip-off force.

TABLE 1

| | | T. Ex. 1<br>Ex. | T. Ex. 2<br>C. Ex. |
|---|---|---|---|
| Composition ratio in cap body (in mass parts) | PC | 100 | 100 |
| Composition ratio in protective cover (polymer composition) (in mass parts) | (A-1) SBS (styrene content ratio: 40% by mass) | 70 | 70 |
| | (A-2) SEBS (styrene content ratio: 33% by mass) | 30 | 30 |
| | (B-1) HDPE | 20 | 20 |
| | (C-1) Fatty acid amide-based lubricant | 0.5 | 0.5 |
| Cap shape | | A | B |
| Evaluation | DuPont type impact test (23° C.) | ○ | ○ |
| | DuPont type impact test (−85° C.) | ○ | ○ |
| | Peeling test 1 | ○ | ○ |
| Peeling test 2 Flip-off force (N) | Average value | 11.8 | 32.8 |
| | Maximum value | 15.9 | 41.0 |
| | Minimum value | 8.0 | 26.5 |

As shown in Table 1, including a polycarbonate-based resin in the cap body and including a styrene-based elastomer in the protective cover can more easily provide a cap less likely to be brittle even under low temperature and having a cap body and a protective cover adhering to each other to a reasonable extent.

According to the present invention, a cap from which a protective cover is easily peeled off can be provided.

A cap of the present invention is a cap for being mounted to a vial that has a mouth located on a top side and having an opening closed by a stopper, and includes: a cap body including a tubular body capable of being externally fitted to the mouth of the vial, and a top plate that is arranged on the top side of the tubular body and that has a through hole through which a top side surface of the stopper is exposed in a state where the tubular body is externally fitted to the mouth of the vial; a protective cover detachably attached to the top side of the top plate; and an attaching device for attaching the protective cover and the top plate to each other, in which the top plate includes a top plate annular portion arranged around the through hole, the protective cover includes a cover body having a lower surface arranged away from the top plate in a state where the protective cover is attached to the top plate, and the attaching device includes a cover attaching portion formed into an annular shape around the through hole and projecting from the lower surface of the cover body toward the top side of the top plate annular portion or from the top side of the top plate annular portion toward the lower surface of the cover body to attach the protective cover and the top plate to each other.

Such a configuration allows the cover attaching portion to attach the protective cover to the top plate annular portion of the cap body in the state where the protective cover is attached to the cap body, and thereby allows the lower surface of the cover body to be separated from the top plate and form a gap around the cover attaching portion. This configuration allows the user to easily place his or her finger on the protective cover in the gap to pinch the protective cover for operation, and thus enables the user to easily peel off the protective cover from the cap body.

The cap can be configured such that the attaching device includes a cover projecting portion arranged radially outside the cover attaching portion.

According to such a configuration, the cover projecting portion is arranged under the cover body and outside the cover attaching portion. Thus, when, for example, a plurality of the caps are packed in a box or a bag for transporting, an intrusion of an end of one of the caps into the gap of another cap between the protective cover and the top plate of the cap body hardly can be prevented by the cover projecting portion.

The cap can be configured such that the cover projecting portion extends radially outward from the cover attaching portion.

According to such a configuration, the cover projecting portion extends to be continuous with the cover attaching portion on the radially outside of the cover attaching portion. Thus, when the protective cover is peeled off from the cap body, the force of peeling off the protective cover is sequentially transmitted from the cover projecting portion to the cover attaching portion to thereby enable the protective cover to be smoothly peeled off.

REFERENCE SIGNS LIST

1: Cap
2: Vial
3: Cap body
4: Tubular body
5: Top plate
6: Protective cover
7: Cover body
8: Cover attaching portion
9: Cover projecting portion
10: Attaching device
20: Mouth
21: Bottle
22: Stopper
40: Vertical rib
50: Through hole
51: Top plate annular portion
52: Top plate extending portion
53: Opening
54: Top plate projecting portion
70: Lower surface
72: Central portion
73: Outer circumferential portion
80: Inner circumferential surface
81: Outer circumferential surface
90: Cover projecting portion
91: First cover projecting portion
92: Second cover projecting portion
210: Bottle mouth
211: Bottle body
212: Flange
220: Large diameter stopper portion
221: Small diameter stopper portion
222: Lower surface
223: Top surface
224: Top surface central portion
225: Top surface outer circumferential portion
510: Hole edge
520: Extension end
700: Central lower surface
701: Outer circumferential lower surface
710: Central top surface
711: Outer circumferential top surface
712: Recessed portion
713: Projecting portion
714: Auxiliary projecting portion
715: Edge portion
920: Auxiliary projecting portion
4A: Cylinder axis
C: Gap

The invention claimed is:

1. A cap for being mounted to a vial that has a mouth located on a top side and having an opening closed by a stopper, the cap comprising:

a cap body comprising a tubular body capable of being externally fitted to the mouth of the vial, and a top plate that is arranged on the top side of the tubular body and that has a through hole through which a top side surface of the stopper is exposed in a state where the tubular body is externally fitted to the mouth of the vial;

a protective cover detachably attached to the top side of the top plate; and an attaching device for attaching the protective cover and the top plate to each other, wherein the top plate comprises a top plate annular portion arranged around the through hole, the protective cover comprises a cover body having a lower surface arranged away from the top plate in a state where the protective cover is attached to the top plate, the attaching device comprising:

a cover attaching portion formed into an annular shape around the through hole and projecting from the lower surface of the cover body toward the top side of the top plate annular portion or from the top side of the top plate annular portion toward the lower surface of the cover body to attach the protective cover and the top plate to each other; and a plurality of cover projecting portions each arranged radially outside the cover attaching portion and extending radially outward from the cover attaching portion, and arranged at equal intervals from each other in a circumferential direction of the cover attaching portion.

2. The cap according to claim 1, wherein the top plate comprises a top plate projecting portion projecting downward from a lower surface of the top plate annular portion, and the top plate projecting portion is formed into an annular shape that surrounds the through hole of the top plate.

3. The cap according to claim 2, wherein an inner circumferential surface of the tubular body of the cap body comprises a plurality of vertical ribs projecting in a radially inward direction from the inner circumferential surface and extending downward, and the plurality of vertical ribs are configured to bring their leading end edges into contact with an outer circumferential portion of the stopper.

4. The cap according to claim 1, wherein an inner circumferential surface of the tubular body of the cap body comprises a plurality of vertical ribs projecting in a radially inward direction from the inner circumferential surface and extending downward, and the plurality of vertical ribs are configured to bring their leading end edges into contact with an outer circumferential portion of the stopper.

5. A capped vial comprising:

a vial that has a mouth located on a top side and having an opening closed by a stopper; and a cap for being mounted to the vial, wherein the cap comprises:

a cap body comprising a tubular body capable of being externally fitted to the mouth of the vial, and a top plate that is arranged on the top side of the tubular body and that has a through hole through which a top side surface of the stopper is exposed in a state where the tubular body is externally fitted to the mouth of the vial;

a protective cover detachably attached to the top side of the top plate; and an attaching device for attaching the protective cover and the top plate to each other, the top plate comprises a top plate annular portion arranged around the through hole, the protective cover comprises a cover body having a lower surface arranged away from the top plate in a state where the protective cover is attached to the top plate, the attaching device comprising:

a cover attaching portion formed into an annular shape around the through hole and projecting from the lower surface of the cover body toward the top side of the top plate annular portion or from the top side of the top plate annular portion toward the lower surface of the cover body to attach the protective cover and the top plate to each other; and a plurality of cover projecting portions each arranged radially outside the cover attaching portion and extending radially outward from the cover attaching portion and arranged at equal intervals from each other in a circumferential direction of the cover attaching portion.

* * * * *